United States Patent
Lao et al.

(10) Patent No.: US 9,311,189 B2
(45) Date of Patent: Apr. 12, 2016

(54) METHOD AND DEVICE FOR INPUTTING DATA IN MULTIMEDIA SERVICE DATABASE ON EMBEDDED DEVICE

(71) Applicant: Huawei Device Co., Ltd., Shenzhen, Guangdong (CN)

(72) Inventors: Peifeng Lao, Mexico City (MX); Xiaotian Zhang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 431 days.

(21) Appl. No.: 13/714,951

(22) Filed: Dec. 14, 2012

(65) Prior Publication Data
US 2013/0103645 A1   Apr. 25, 2013

Related U.S. Application Data

(63) Continuation of application No. PCT/CN2011/083940, filed on Dec. 14, 2011.

(30) Foreign Application Priority Data

Dec. 17, 2010   (CN) .......................... 2010 1 0605238

(51) Int. Cl.
*G06F 11/14*   (2006.01)
*G06F 17/30*   (2006.01)

(52) U.S. Cl.
CPC ........ *G06F 11/1446* (2013.01); *G06F 11/1435* (2013.01); *G06F 17/30017* (2013.01); *G06F 11/1461* (2013.01)

(58) Field of Classification Search
CPC .............................. G06F 11/14; G06F 11/1446
USPC .................................................. 707/100, 101
See application file for complete search history.

(56) References Cited

U.S. PATENT DOCUMENTS

| 6,449,625 | B1 * | 9/2002 | Wang | |
| 2006/0098899 | A1 * | 5/2006 | King et al. | 382/305 |

(Continued)

FOREIGN PATENT DOCUMENTS

| CN | 1937065 A | 3/2007 |
| CN | 101140780 A | 3/2008 |

(Continued)

OTHER PUBLICATIONS

Foreign Communication from a Counterpart Application, Chinese Application 201010605238.9, Chinese Office Action dated May 3, 2012, 4 pages.

(Continued)

*Primary Examiner* — Jacob F Bétit
*Assistant Examiner* — Reza Hosseini
(74) *Attorney, Agent, or Firm* — Conley Rose, P.C.; Grant Rodolph; Nicholas K. Beaulieu

(57) ABSTRACT

The present invention discloses a method and a device for inputting data in a multimedia service database on an embedded device. The method includes: when multimedia file scanning is performed, storing generated directory information of a multimedia file in a random access memory database (RAM-DB), and performing a RAM-DB to backup database (BAK-DB) data backup operation in a scanning process; and if an interruption occurs in the scanning process, and when the scanning continues after the scanning interruption ends, copying data in the BAK-DB to the RAM-DB, and continuing to scan, according to existing data in the RAM-DB, a multimedia file that is not scanned. In the present invention, two database files RAM-DB and BAK-DB are configured in a multimedia service system.

2 Claims, 1 Drawing Sheet

(56) References Cited

U.S. PATENT DOCUMENTS

| | | | |
|---|---|---|---|
| 2007/0065118 | A1 | 3/2007 | Chen |
| 2008/0056674 | A1 | 3/2008 | Chen |
| 2008/0294691 | A1 | 11/2008 | Chang et al. |
| 2010/0057886 | A1 | 3/2010 | Dodge |
| 2010/0074589 | A1 | 3/2010 | Dinallo et al. |
| 2012/0063364 | A1* | 3/2012 | Emmelmann et al. ........ 370/255 |

FOREIGN PATENT DOCUMENTS

| | | |
|---|---|---|
| CN | 101365044 A | 2/2009 |
| CN | 101382907 A | 3/2009 |
| CN | 101901175 A | 12/2010 |
| CN | 102142010 A | 8/2011 |
| EP | 2073524 A1 | 6/2009 |

OTHER PUBLICATIONS

Foreign Communication from a Counterpart Application, Chinese Application 201010605238.9, Partial English Translation of Chinese Office Action dated May 3, 2012, 4 pages.

Foreign Communication From a Counterpart Application, European Application No. 11848524.2, Extended European Search Report dated Jul. 25, 2013, 5 pages.

Foreign Communication From a Counterpart Application, PCT Application No. PCT/CN2011/083940, English Translation of Written Opinion dated Mar. 22, 2012, 8 pages.

Foreign Communication From a Counterpart Application, Chinese Application 201010605238.9, Chinese Office Action dated Jan. 14, 2013, 5 pages.

Foreign Communication From a Counterpart Application, Chinese Application 201010605238.9, Partial English Translation of Chinese Office Action dated Jan. 14, 2013, 8 pages.

Communication from a foreign counterpart application, International Application No. PCT/CN2011/083940, International Search Report dated Mar. 22, 2012, 3 pages.

Communication from a foreign counterpart application, International Application No. PCT/CN2011/083940, Partial English Translation, International Search Report dated Mar. 22, 2012, 2 pages.

* cited by examiner

METHOD AND DEVICE FOR INPUTTING DATA IN MULTIMEDIA SERVICE DATABASE ON EMBEDDED DEVICE

CROSS-REFERENCE TO RELATED APPLICATIONS

This application is a continuation of International Application No. PCT/CN2011/083940, filed on Dec. 14, 2011, which claims priority to Chinese Patent Application No. 201010605238.9, filed on Dec. 17, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to multimedia processing technologies, and in particular, to a method and a device for inputting data in a multimedia service database on an embedded device.

BACKGROUND

With enhancement of the calculation capability and the I/O performance of an embedded device, a storage device is used to store a large number of multimedia files. More and more embedded devices can provide multimedia services. Permanent high-capacity memories, such as a secure digital (SD) storage card, a USB universal serial bus (USB) disk, and an external serial advanced technology attachment (SATA) hard disk, are widely used in external storage of embedded multimedia service devices.

A multimedia service program needs to scan a multimedia file and parse the multimedia file to extract directory information, such as a title of the multimedia file, a bookmark and an explanation of the multimedia file. The directory information is used to issue a multimedia content directory. The extracted directory information needs to be stored in a small-sized database, providing for a client to perform browsing and retrieval. The database is called a media service database.

When the directory information of the multimedia file is input in the media service database during a process of scanning the multimedia file, operations such as parsing the multimedia file, storing the directory information in the media service database, and querying the database, need to take a great deal of time. Scanning time directly influences the experience of a customer, and how to improve scanning performance is a focus that needs attention in the development of the embedded multimedia services.

In a solution of the prior art 1, a memory file system is adopted to input data of a media service database. After a device is started each time, the media service database is re-created, a media file is re-scanned to generate directory information, and the directory information is input in the media service database.

However, the solution of the prior art 1 has the following disadvantages: The media service database is lost when the device is powered-off, and the next time it is required to re-create the media service database and scan the media data, so a user needs to wait for a long time. Moreover, the re-scanning may probably change an identification (ID) of the directory information corresponding to the media file, which causes a play list and a bookmark of a client to become invalid and brings failed experience to the user.

In a solution of the prior art 2, an external storage device is adopted to store a media database. Directory information in the media service database can be stored permanently. After a media file is added or deleted, only the media database is updated.

However, in the solution of the prior art 2, the media service database has a poor read-and-write performance, thereby affecting a service response speed. Moreover, the media database is easily damaged due to hot swapping of the external access memory by a user, which results in a running exception of a program.

It can be known from the above that in the solutions of the prior art, when the directory information of the multimedia file is input in the media service database, it is possible that the occurrence of an exception state results in that the directory information in the media service database changes, so that a client program cannot normally use the directory information in the media service database, thereby causing the exception of the program and affecting the experience of the customer.

SUMMARY

The present invention discloses a method and a device for inputting data in a multimedia service database on an embedded device, which are used to guarantee safety and reliability of data stored in a media service database when multimedia file scanning is performed, thereby improving the service experience of a user.

The present invention provides a method for inputting data in a multimedia service database on an embedded device that includes: when multimedia file scanning is performed, storing generated directory information of a multimedia file in a random access database (RAM-DB) and performing a RAM-DB to backup database (BAK-DB) data backup operation in a scanning process; and if an interruption occurs in the scanning process, and when the scanning continues after the scanning interruption ends, copying data in the BAK-DB to the RAM-DB, and continuing to scan, according to existing data in the RAM-DB, a multimedia file that is not scanned.

The present invention further provides a device for inputting data in a multimedia service database on an embedded device that includes: a scanning module configured to, when multimedia file scanning is performed, store generated directory information of a multimedia file in a RAM-DB; a backup module configured to, in a scanning process, perform a RAM-DB to BAK-DB data backup operation; and an interruption processing module configured to, if an interruption occurs in the scanning process, and when the scanning continues after the scanning interruption ends, copy data in the BAK-DB to the RAM-DB, and continue to scan, according to existing data in the RAM-DB, a multimedia file that is not scanned.

In the present invention, two database files RAM-DB and BAK-DB are configured in a multimedia service system, so as to avoid a problem of multimedia file scanning error caused by an interruption, thereby achieving high efficiency, data persistence and reliability of a multimedia service, and improving user experience of an embedded multimedia service, having a high practicability.

BRIEF DESCRIPTION OF THE DRAWINGS

To illustrate technical solutions in embodiments of the present invention more clearly, accompanying drawings required for describing the embodiments of the present invention are introduced briefly in the following. Apparently, the accompanying drawings in the following descriptions merely show some embodiments of the present invention, and persons of ordinary skill in the art can derive other drawings from these accompanying drawings without creative efforts.

DETAILED DESCRIPTION

Technical solutions in embodiments of the present invention are described clearly and completely in the following with reference to accompanying drawings in the embodiments of the present invention. Apparently, the described embodiments are only part rather than all of the embodiments of the present invention. All other embodiments, which can be derived by persons of ordinary skill in the art based on the embodiments of the present invention without creative efforts, shall fall within the protection scope of the present invention.

Figure 1:
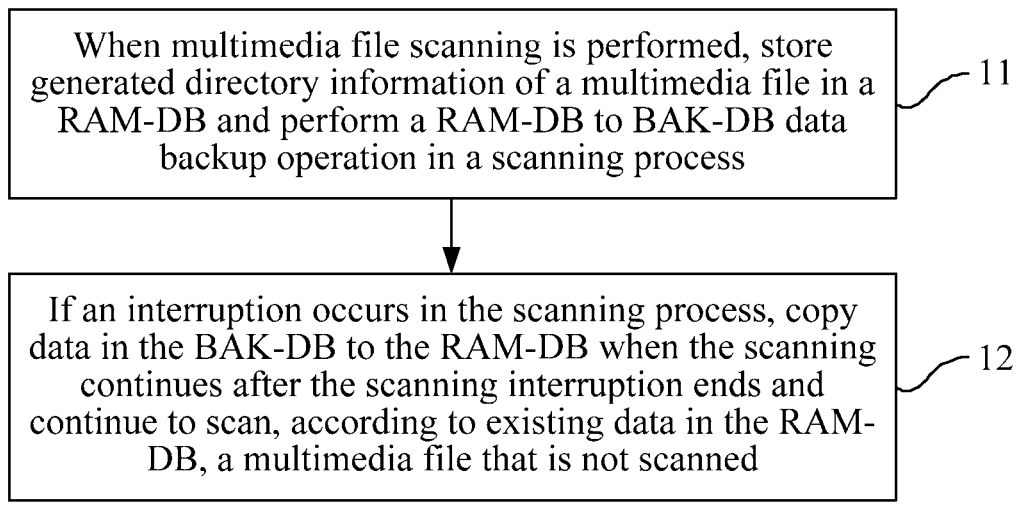
FIG. 1 is a flow chart of a method for inputting data in a multimedia service database on an embedded device according to an embodiment of the present invention.

Referring to FIG. 1, it shows a method for inputting data in a multimedia service database on an embedded device provided in an embodiment of the present invention. The method is used to ensure safety and reliability of data input in the media service database, so as to guarantee that a client can obtain data in the media service database precisely and effectively, thereby guaranteeing high efficiency and reliability of a multimedia service, and improving user experience of an embedded multimedia service.

In the embodiment of the present invention, by optimizing a media database inputting solution, high efficiency, data persistence and reliability of the multimedia service database on the embedded device are achieved, thereby improving the user experience of the embedded multimedia service.

In the technical solution of this embodiment, it is required to use two database files. One is a database file located in a memory file system and is a random access memory database (RAM-DB), and the other is a backup database file located in an external access memory and is a backup database (BAK-DB). The RAM-DB adopts a random access memory, the features of which are high read-and-write performance, good reliability, and memory data which disappears during power-off. The BAK-DB is an external access memory, where data can be stored permanently even after power-off, but read-and-write performance is poor and reliability is poor.

In this embodiment, when performing first scanning on a multimedia file in the external access memory, an embedded multimedia service program generates the RAM-DB first, stores generated directory information of the multimedia file in the RAM-DB, and backs up data in the RAM-DB to the BAK-DB at certain backup time intervals or each time when a certain data amount is added. A backup time interval may be set in advance according to a specific requirement, for example, it is set to perform RAM-DB to BAK-DB backup once every 5 seconds or 10 seconds. After the scanning of all multimedia files is completed, the data in the RAM-DB is entirely backed up to the BAK-DB.

If an unexpected interruption occurs in a scanning process, for example, the device is re-started after power-off, a media server is re-started, or an external access memory is plugged, the data in the BAK-DB is restored to the RAM-DB after the interruption ends. During a process of scanning a multimedia file, if directory information corresponding to the multimedia file exists in the media service database, the multimedia file is skipped. After the scanning ends, it is required to delete all directory information which is input in the media service database but has no corresponding multimedia file in a hard disk, and at the same time, back up the RAM-DB to the BAK-DB again. In this case, disaster backup of the media service database in the scanning process can be implemented.

Based on the foregoing RAM-DB and BAK-DB, the method for storing data in a database provided in the present invention is as follows.

Step 11: When multimedia file scanning is performed, store generated directory information of a multimedia file in the RAM-DB and perform a RAM-DB to BAK-DB data backup operation in the scanning process.

When one multimedia file in the external access memory is scanned, it may be detected whether directory information of the multimedia file exits in the BAK-DB. If yes, it is indicated that the multimedia file has already been scanned before, and after the directory information of the multimedia file is copied from the BAK-DB to the RAM-DB, scanning of the multimedia file may be skipped, and a multimedia file that is not scanned is scanned. In this way, the previous scanning continues. If no, it is indicated that the multimedia file has not been scanned before, and it is required to divide a memory space in the RAM-DB, so as to store the directory information of the multimedia file.

Therefore, after the directory information of the multimedia file is copied from the BAK-DB to the RAM-DB, during the process of scanning the multimedia file, it is further required to detect whether the directory information corresponding to the multimedia file exists in the RAM-DB. If it exists, it is indicated that the multimedia file has been scanned, and a scanning operation performed on the multimedia file is skipped. If it does not exist, the multimedia file is parsed and the generated corresponding directory information is written into the RAM-DB. The RAM-DB is established when the multimedia service program performs the first scanning. When multiple multimedia files are scanned, each time one multimedia file is scanned, it is required to divide a certain memory space in the RAM-DB to store directory information corresponding to the multimedia file.

In this embodiment, when the multimedia file is scanned, the multimedia file is parsed, and the generated corresponding multimedia directory information is written into the RAM-DB. Data in the RAM-DB may be backed up to the BAK-DB according to a preset scanning backup time interval. For example, for an important multimedia file, it may be set that backup is performed every 1 to 3 seconds, and for a less important multimedia file, it may be set that backup is performed every 5 to 10 seconds.

Alternatively, it may also be adopted to perform a backup once each time when a certain data amount of multimedia directory information is added. It is detected whether the data amount of the multimedia directory information added in the RAM-DB reaches a preset value. If yes, the RAM-DB to BAK-DB data backup operation is performed once.

Step 12: If an interruption occurs in the scanning process, copy data in the BAK-DB to the RAM-DB when the scanning interruption ends, and continue to scan, according to existing data in the RAM-DB, a multimedia file that is not scanned.

If the interruption occurs, it is required to continue the previous scanning after the interruption ends. For example, a certain external access memory has 800 files, and an interruption occurs when a 101st file is scanned. Accordingly, directory information corresponding to the previous 100 multimedia files is generated through scanning. During the previous scanning process, data in the RAM-DB has been backed up to the BAK-DB, so that after the interruption ends, the data in the BAK-DB is restored to the RAM-DB. The RAM-DB has the directory information of the 100 multimedia files generated through scanning previously. In this way, after the interruption ends, the previous scanning can continue, and the scanning continues starting from the 101st multimedia file. In this way, a speed of scanning multimedia files in the external access memory in a burst situation is increased, which avoids the degradation of user experience caused by the burst interruption.

According to the foregoing method, the disaster backup in the scanning process of the multimedia file is implemented, so that the scanning of the multimedia file is not affected by an interruption.

Further, when multimedia files change, for example, part of the multimedia files are added in or part of the multimedia files are deleted from the hard disk or the external access memory, it is required to update directory information in the multimedia service database when the multimedia file scanning is performed again.

In this case, a method for processing data in a multimedia service data block is as follows: When it is detected that a new multimedia file is scanned, generated directory information of the new multimedia file is monitored; the directory information of the new multimedia file is updated and stored in the RAM-DB, and data in the RAM-DB is backed up to the BAK-DB.

After the multimedia file scanning is completed, all generated multimedia directory information is stored in the multimedia service database. It may be possible that part of the multimedia files are deleted or part of the multimedia files are altered, so that after the scanning ends, it is required to clean up related directory information of a multimedia file that does not exist in the multimedia service database and to entirely back up the data in the RAM-DB to the BAK-DB. For example, a certain multimedia file is deleted from the external access memory before being scanned, but corresponding directory information of the multimedia file still exists in the multimedia service database. After the scanning is completed, it is required to delete the directory information, so as to avoid that a client program reads directory information but fails to request a service of a corresponding multimedia file.

When the RAM-DB to BAK-DB backup is performed, the following method may be adopted: when storing the directory information of the multimedia file to the RAM-DB, detect whether a data amount added in the RAM-DB reaches a preset backup data amount; and if yes, perform the RAM-DB to BAK-DB data backup once. For example, when scanning the multimedia file, it may be set that backup is performed once each time when 100 k data is added in the RAM-DB, so as to avoid frequent backup operations that waste resources of a system.

The method for storing data in the multimedia service database in the embodiment of the present invention has a wide application scope. For example, the method is applicable in the following scenarios: In a home gateway having a digital living network alliance (DLNA) media server, a USB hard disk is usually used as an external storage device; in a smart phone having a digital media playing application program server (e.g., an iTunes server), a built-in SD storage card or a micro hard disk is usually used as an external access memory; and in a set top box that supports a DLNA media server, a built-in SATA hard disk or an external USB hard disk is usually used as an external access memory.

In the foregoing application scenarios, a procedure of a method for inputting data in the media service database is similar to that of the foregoing method, which is not described again herein.

In this embodiment, two database files RAM-DB and BAK-DB are configured in a multimedia service system. Read speeds and storing stability of the two database files are complementary to each other in advantages and disadvantages, and data backup of the multimedia service database can be implemented at the same time, so as to avoid a problem of a multimedia file scanning error caused by an interruption, thereby achieving high efficiency, data persistence and reliability of a multimedia service, and improving user experience of an embedded multimedia service, having a high practicability.

Figure 2:
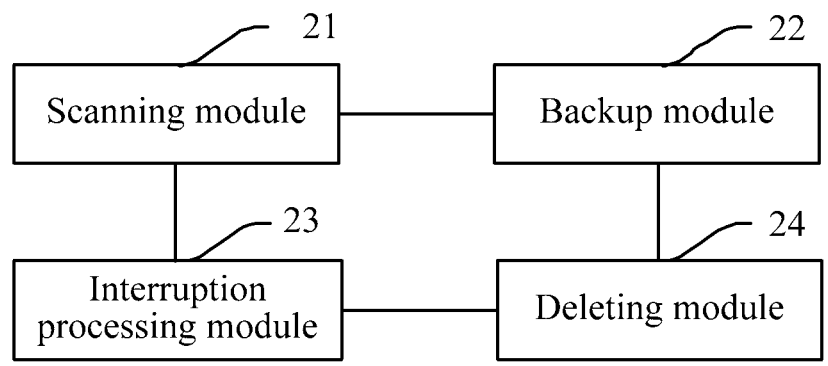
FIG. 2 is a schematic structural diagram of a device for inputting data in a multimedia service database on an embedded device according to another embodiment of the present invention.

FIG. 2 is a schematic structural diagram of a device for inputting data in a multimedia service database on an embedded device according to another embodiment of the present invention. The device includes: a scanning module 21 configured to, when multimedia file scanning is performed, store generated directory information of a multimedia file in a RAM-DB; a backup module 22 configured to, in a scanning process, perform a RAM-DB to BAK-DB data backup operation; and an interruption processing module 23 configured to, if an interruption occurs in the scanning process, and when the scanning continues after the scanning interruption ends, copy data in a BAK-DB to the RAM-DB, and continue to scan, according to existing data in the RAM-DB, a multimedia file that is not scanned.

When the multimedia file scanning is performed, for a multimedia file that has been scanned before, a scanning operation may be skipped, so as to directly scan the multimedia file that is not scanned. The scanning module 21 is further configured to, when scanning a multimedia file, detect whether directory information of the multimedia file exists in the BAK-DB; if yes, copy the directory information of the multimedia file to the RAM-DB and skip a scanning operation performed on the multimedia file; and otherwise, scan the multimedia file and write generated directory information of the multimedia file into the RAM-DB.

After the directory information of the multimedia file is copied from the BAK-DB to the RAM-DB, during the process of scanning the multimedia file, it is required to detect whether the directory information corresponding to the multimedia file exists in the RAM-DB. If it exists, it is indicated that the multimedia file has been scanned, and the scanning operation performed on the multimedia file is skipped. If it does not exist, the multimedia file is parsed, and the generated corresponding directory information is written into the RAM-DB. The scanning module 21 is further configured to, when scanning a multimedia file, detect whether directory information of the multimedia file exists in the RAM-DB; if yes, skip a scanning operation performed on the multimedia file; and otherwise, scan the multimedia file and write generated directory information of the multimedia file in the RAM-DB.

When data backup is performed, a manner of backing up according to time may be adopted, and a manner of backing up according to a data amount may also be adopted. The backup module 22 is configured to detect whether a data amount of directory information of multimedia files which is added in the RAM-DB reaches a preset value, and if yes, perform the RAM-DB to BAK-DB data backup operation once. Alternatively, the backup module 22 is configured to perform the RAM-DB to BAK-DB data backup operation according to a preset scanning backup time interval.

In addition, after the multimedia file scanning is completed, all generated multimedia directory information is stored in the multimedia service database. It is possible that part of the multimedia files are deleted or that part of the multimedia files are altered, so after the scanning ends, it is required to clean up related directory information of a multimedia file that does not exist in the multimedia service database. The device also includes a deleting module 24 configured to, after the multimedia file scanning is completed, delete, in the media database, directory information of the multimedia file that is not scanned.

In this embodiment, two database files RAM-DB and BAK-DB are configured in a multimedia service system. Read speeds and storing stability of the two database files are complementary to each other in advantages and disadvantages, and data backup of the multimedia service database can be implemented at the same time, so as to avoid a problem of multimedia file scanning error caused by an interruption, thereby achieving high efficiency, data persistence and reliability of a multimedia service, and improving user experience of an embedded multimedia service, having a high practicability.

Persons of ordinary skill in the art can understand that an accompanying drawing is only a schematic diagram of an embodiment and that modules or processes in the accompanying drawings are not necessarily required for implementing the present invention.

Persons of ordinary skill in the art should understand that modules in the device in the embodiment may be distributed in the device of the embodiment according to the description of the embodiment, and the modules may also be correspondingly changed to be located in one or more devices different from that in this embodiment. The modules in the foregoing embodiment may be combined into one module and may also be further split into multiple submodules.

The sequence numbers of the preceding embodiments of the present invention are merely for description but do not represent the preference of the embodiments.

Persons skilled in the art can clearly understand that the embodiments of the present invention may be implemented in a manner of software plus a necessary universal hardware platform. Based on such understanding, the essence of the technical solutions in the embodiments of the present invention or the part that makes contribution to the prior art can be embodied in a form of a software product. The computer software product may be stored in a storage medium such as a read-only memory (ROM), random-access memory (RAM), a magnetic disk, or an optical disk, and include several instructions to make a computer device (e.g., a personal computer, a server, or a network device) perform the methods described in the embodiments of the present invention or in some parts of the embodiments of the present invention.

The foregoing embodiments are not intended to limit the present invention. For persons of ordinary skill in the art, any modification, equivalent replacement, and improvement made without departing from the principle of the present invention shall fall within the protection scope of the present invention.

What is claimed is:

1. A method for inputting data in a multimedia service database on an embedded device comprising:

storing generated directory information of a multimedia file in a random access memory database (RAM-DB) when a multimedia file scanning process is performed;

performing a RAM-DB to backup database (BAK-DB) data backup operation in the multimedia file scanning process;

copying data in the BAK-DB to the RAM-DB based at least in part upon an occurrence of an interruption in the multimedia file scanning process;

continuing to scan, according to existing data in the RAM-DB, a multimedia file that is not scanned after the interruption ends;

detecting whether the directory information of the multimedia file exists in the BAK-DB when scanning the multimedia file;

copying the directory information of the multimedia file in the BAK-DB to the RAM-DB when the directory information of the multimedia file is detected in the BAK-DB;

scanning the multimedia file and writing generated directory information of the multimedia file into the RAM-DB when the directory information of the multimedia file is not detected in the BAK-DB;

detecting whether the directory information of the multimedia file exists in the RAM-DB when scanning the multimedia file;

skipping a scanning operation performed on the multimedia file when the directory information of the multimedia file is detected in the RAM-DB; and scanning the multimedia file and writing the generated directory information of the multimedia file into the RAM-DB when the directory information of the multimedia file is not detected in the RAM-DB.

2. A device for inputting data in a multimedia service database on an embedded device comprising:

a scanning module configured to, when multimedia file scanning is performed, store generated directory information of a multimedia file in a random access memory database (RAM-DB);

a backup module configured to, in a scanning process, perform a RAM-DB to backup database (BAK-DB) data backup operation; and an interruption processing module configured to copy data in the BAK-DB to the RAM-DB based at least in part upon an occurrence of an interruption in the scanning process and continue to scan, according to existing data in the RAM-DB, a multimedia file that is not scanned, wherein the scanning module is further configured to:

detect whether directory information of the multimedia file exists in the BAK-DB when scanning the multimedia file;

copy the directory information of the multimedia file in the BAK-DB to the RAM-DB when the directory information of the multimedia file is detected in the BAK-DB;

scan the multimedia file and write generated directory information of the multimedia file into the RAM-DB when the directory information of the multimedia file is not detected in the BAK-DB;

detect whether directory information of the multimedia file exists in the RAM-DB when scanning the multimedia file;

skip a scanning operation performed on the multimedia file when the directory information of the multimedia file is detected in the RAM-DB; and scan the multimedia file and write generated directory information of the multimedia file into the RAM-DB when the directory information of the multimedia file is not detected in the RAM-DB.

* * * * *